United States Patent
Duprey (10) Patent No.: US 7,677,894 B2
(45) Date of Patent: *Mar. 16, 2010

(54) ARTICLES WITH SPINNING GLOBE

(76) Inventor: John F. Duprey, 807 Sixth St., Watervliet, NY (US) 12189

( * ) Notice: Subject to any disclaimer, the term of this patent is extended or adjusted under 35 U.S.C. 154(b) by 180 days.

This patent is subject to a terminal disclaimer.

(21) Appl. No.: 11/907,515

(22) Filed: Oct. 12, 2007

(65) Prior Publication Data

US 2008/0038699 A1  Feb. 14, 2008

Related U.S. Application Data

(60) Division of application No. 11/080,818, filed on Mar. 16, 2005, now Pat. No. 7,291,015, which is a continuation-in-part of application No. 11/035,738, filed on Jan. 18, 2005, now abandoned, which is a continuation of application No. 10/873,137, filed on Jun. 23, 2004, now Pat. No. 6,843,655.

(51) Int. Cl.
  *G09B 27/08* (2006.01)
(52) U.S. Cl. ................................. 434/131; 434/132
(58) Field of Classification Search ............ 434/130, 434/131, 133, 134, 136, 148, 132; 446/268, 446/369, 370, 373, 71, 72, 76, 77; D10/10; D11/152, 157; D19/61
  See application file for complete search history.

(56) References Cited

U.S. PATENT DOCUMENTS

| 2,055,852 A | 9/1936 | Resnick | |
| 2,140,124 A | 12/1938 | Banner et al. | |
| 3,016,629 A | 1/1962 | Case | 434/147 |
| 3,045,900 A | 7/1962 | Zekendorf | |
| 3,055,124 A | 9/1962 | Gilmer | 434/132 |
| 3,618,955 A | 11/1971 | Barnes | 273/157 R |
| 3,750,192 A | 8/1973 | Beresic | |
| 3,765,031 A | 10/1973 | Beresic | |
| 3,813,016 A | 5/1974 | Bohannan | |
| 4,050,493 A | 9/1977 | Cho | |
| 4,400,161 A | 8/1983 | Gerlt | |

(Continued)

FOREIGN PATENT DOCUMENTS

JP    10-140416    5/1998

OTHER PUBLICATIONS shop.store.yahoo.com/giftwagon/spglculi.htm, Dec. 22, 2004, Spinning Globe Cuff Links.

*Primary Examiner*—Kurt Fernstrom
(74) *Attorney, Agent, or Firm*—Richard C. Litman (57) ABSTRACT

The articles with spinning globe include articles worn by a user and containers in which a spinning or rotating globe is disposed. The articles of apparel may be a shirt, a pair of pants, a hat or other wearing apparel. The container may be a backpack, a purse, a suitcase, a lunchbox or other carrying container. The rotating globe is mounted in the articles of apparel and the containers so that a user may manually rotate the globe within the articles of apparel or the containers. The rotating globe may be placed in any of the articles and used by children as an educational tool to learn about geography, or by adults to note specific time zones when traveling or determine where a specific country is in relation to other countries.

7 Claims, 11 Drawing Sheets

U.S. PATENT DOCUMENTS

| | | | |
|---|---|---|---|
| 4,494,935 A | 1/1985 | Miller | 424/132 |
| 4,595,367 A | 6/1986 | Forsyth | 434/147 |
| 4,601,070 A | 7/1986 | Sargentini | |
| D311,266 S | 10/1990 | Parker | |
| 4,960,233 A | 10/1990 | Morchower | |
| 5,088,127 A | 2/1992 | Thornock | |
| 5,222,259 A | 6/1993 | Bristor | |
| 5,676,550 A | 10/1997 | Glamportone | 434/132 |
| 5,734,991 A | 4/1998 | Schmid | |
| 5,819,998 A | 10/1998 | Chehebar | |
| 5,897,042 A | 4/1999 | Sims | |
| D409,662 S * | 5/1999 | Ho | D19/61 |
| 5,933,866 A | 8/1999 | Fox | |
| 6,038,698 A | 3/2000 | Lawler | |
| 6,769,139 B1 | 8/2004 | Goldkind | |
| 6,769,588 B2 | 8/2004 | Zheng | |
| 6,843,655 B1 | 1/2005 | Duprey | |
| 2002/0157289 A1 | 10/2002 | Hsueh | |
| 2003/0230368 A1 | 12/2003 | Cazes | |
| 2004/0118891 A1 | 6/2004 | Esqueda | |
| 2004/0144675 A1 | 7/2004 | Chen | |

* cited by examiner

ARTICLES WITH SPINNING GLOBE

CROSS REFERENCE TO RELATED APPLICATION

This is a division of application Ser. No. 11/080,818, filed Mar. 16, 2005 and now issued as U.S. Pat. No. 7,291,015 B2, which is a continuation-in part of my prior application Ser. No. 11/035,738, filed Jan. 18, 2005 and now abandoned, which is a continuation of my prior application Ser. No. 10/873,137, filed Jun. 23, 2004 and now issued as U.S. Pat. No. 6,843,655 B1, which is hereby incorporated by reference in its entirety.

BACKGROUND OF THE INVENTION

1. Field of the Invention

The present invention relates to articles with a spinning globe, and particularly to articles of apparel and containers with a spinning globe.

2. Description of the Related Art

Knowledge of geography is essential for appreciating the physical and social aspects of the complex global world in which we live. Traditional teaching devices for facilitating comprehension of world geography are rarely useful for most children. A conventional world globe, for example, is a teaching device that is frequently used to educate children on world geography. In the classroom, however, few children feel comfortable familiarizing themselves with a heavy globe that may rest on a teacher's desk or bookshelf. Outside of the classroom, most children would prefer not to amuse themselves with a traditional learning device, such as a globe of the earth.

In addition, adults who travel do not generally have quick and easy access to a world map or time zone information. When flying or traveling from one destination to another, they may want to determine the particular time zone to which they are traveling or, for world travel, to ascertain where they are in relation to surrounding countries or bodies of water. While maps do exist for the travelers to access, world maps are often large and cumbersome to unfold and observe. Also, maps do not show an accurate representation of some countries, for example, the size of Greenland in relation to other countries, and therefore do not provide a fully precise depiction of the geography of the world.

Accordingly, there is a need for articles that allow both children and adults easy access to a rotatable globe to learn about world geography and examine where countries and geographic locations are in the world. Thus, articles with a spinning globe solving the aforementioned problems are desired.

SUMMARY OF THE INVENTION

The articles with spinning globe include articles worn by a user and containers in which a rotating globe is disposed. The articles worn by a user may be a shirt, a pair of pants, a hat, or any item of apparel that may support a spinning globe. The containers may be a backpack, a purse, a suitcase a lunchbox, or any other container that may support a spinning globe. A rotating globe is built into the articles worn by a user, or is mounted in a wall of the container.

The three-dimensional rotating globe is built into a pocket in the shirt or in the knee of the pants, and is mounted so that a user may manually rotate the globe. Any conventional mount that allows the globe to spin or rotate may be used. For example, the globe may revolve using pins fixed in the pocket or knee of the pants and attached to the globe, or using a rod or other cylindrical structure that extends through the globe and attaches at opposing ends of the globe to the pocket or knee of the pants. The globe may be disposed within the crown portion of a hat using similar mounts.

The globe may be built into the fabric of a main body portion of the backpack or the purse. The suitcase, briefcase and lunchbox each have a main body portion formed by a plurality of sides or walls. The globe is built into one of the walls of the main body portion of each container.

The globe may optionally include electronic features for lighting all or part of the globe, for rotating the globe, and/or for playing an audio message containing educational information regarding a geographical region displayed on the globe, or relating to the rotation of the earth, or other educational information.

The rotating globe may be placed in any of the articles and used by children as an educational tool to learn about geography and the structure of the earth, for example, by observing the globe in the shirt, the pants, the backpack or the lunchbox. Also, adults may be able to note specific time zones when traveling or determine where a specific country is in relation to other countries, for example, by observing the globe built into the suitcase, the briefcase, the purse or the backpack.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention relates to articles with a spinning globe, including articles worn by a user and containers carried by a user. The articles worn by a user may be, for example, a shirt, a pair of pants, a hat, or any wearing apparel that can support a spinning globe. The containers may be, for example, a backpack, a purse, a suitcase, a lunchbox, or any other container that may be carried by a user and that can support a spinning globe. A rotating or spinning globe is built into the articles worn by a user or mounted in a wall or side panel of the containers.

Figure 1:
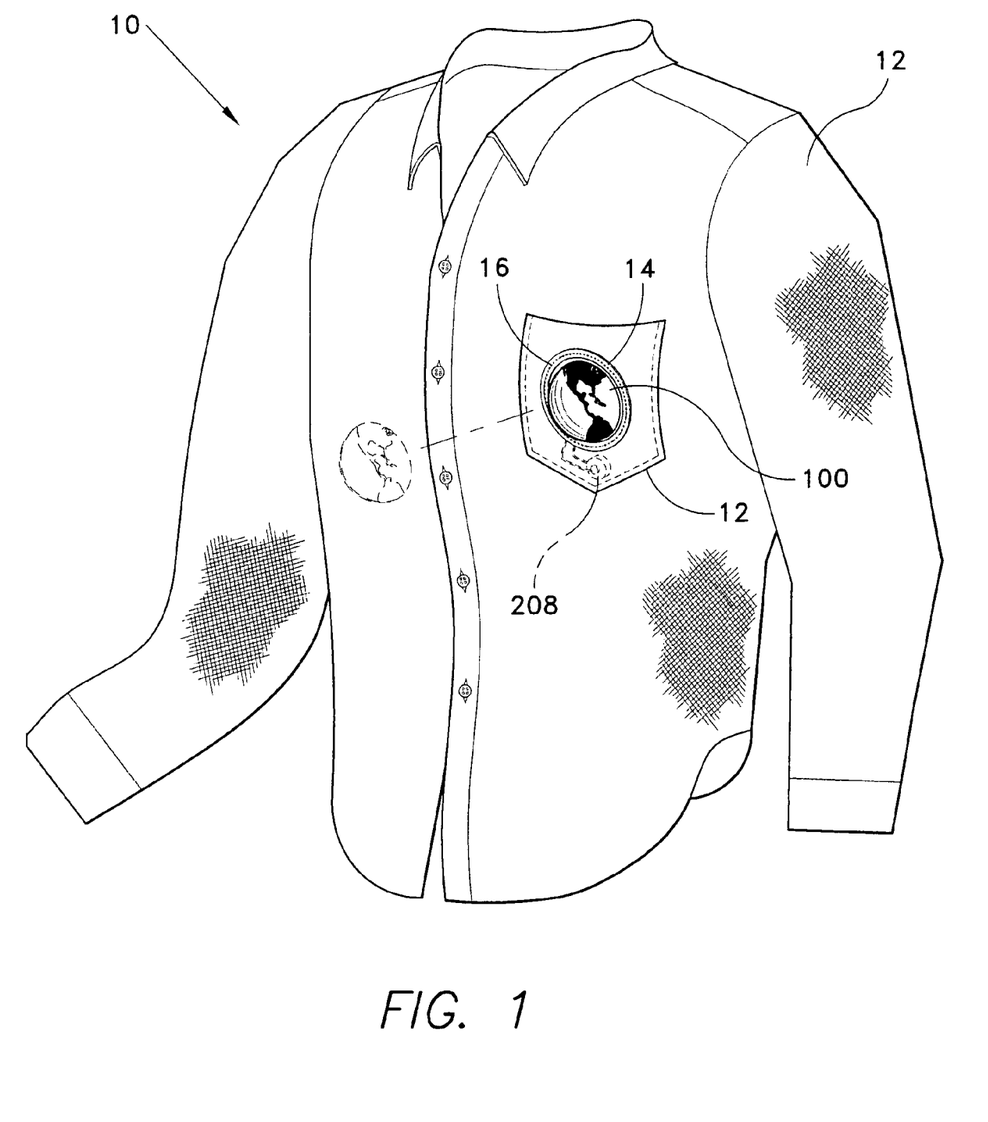
FIG. 1 is a perspective view of a shirt with an exploded view of a spinning globe according to a first embodiment of the present invention.

Referring first to FIG. 1, a perspective view of a shirt with spinning globe 10 is shown. The shirt 10 is adapted for wear by a man or woman. A three-dimensional globe 100 is attached to the shirt 10. The globe 100 is rotatable within the fabric of the shirt 10. The shirt 10 may have a pocket 12 into which the globe 100 is built so that the globe 100 may rotate. The globe 100 can be positioned within the fabric of the pocket 12 in any manner that would allow a user to manually rotate the globe 100 within the pocket 12. A portion of the globe is visible outside the fabric of the shirt 10.

The globe 100 includes a map or image of the earth on its exterior surface, including any or all of the indicia of a standard reproduction of the earth's surface. Thus, the map may include raised portions or contours to represent mountain ranges, as well as other topography. The globe 100 can be made from plastic, fabric, foam, or any other suitable material.

The globe 100 may be positioned within the fabric of the shirt 10 by first disposing a supportive frame 14 within the pocket 12 of the shirt 10. The globe 100 is then positioned within the frame 14 in any conventional manner that would allow a user to manually rotate the globe 100 within the frame 14. The frame 14 may include attachment holes 16, which may be used to attach the frame 14 to the shirt 10. The attachment holes 16 allow the frame 14 to be sewn to the pocket 12 of the shirt 10 or the shirt 10 itself if the globe 100 is to be positioned directly in the fabric of the shirt 10, thereby retaining the frame 14 and globe 100 within the fabric of the shirt 10.

The globe 100 may be electrically connected to a motor 208, located either within the pocket 12 or attached to the outside of the shirt 10, that may initiate rotation of the globe 100.

Figure 2A:
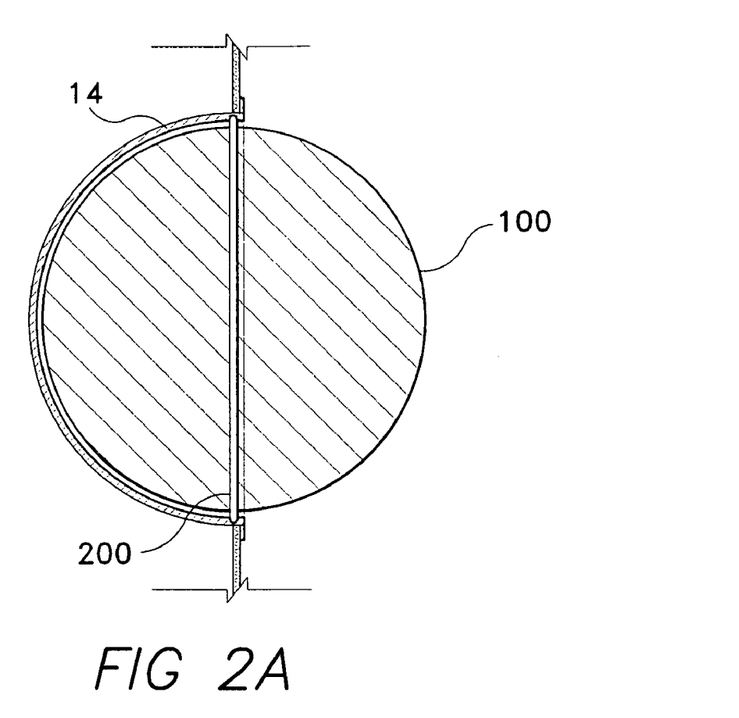
FIG. 2A is a fragmented section view of a portion of the shirt with spinning globe according to the present invention, showing a first embodiment of the spinning globe according to the present invention.

The globe 100 is positioned within the frame 14 in any manner that would allow a user to rotate the globe 100 within the frame 14. As shown in FIG. 2A, for example, a rod 200 or other suitable cylindrical structure may extend through the globe 100 and attach at its opposing ends to the frame 14. The globe 100 may thereby revolve around the rod 200 when manually spun. The globe 100 may be equipped with bearings where the rod 200 enters and exits the globe 100 to ensure smooth rotation of the globe 100 around the rod 200.

Figure 2B:
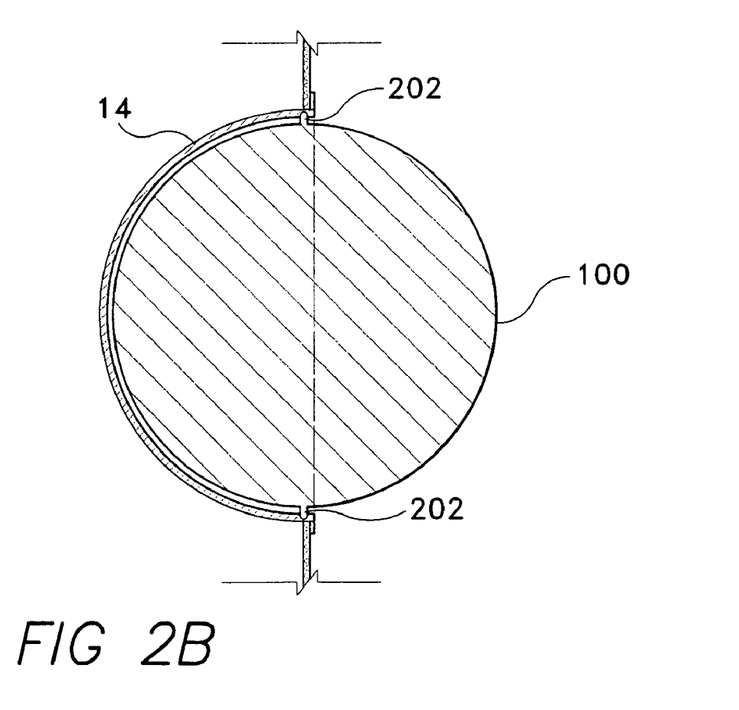
FIG. 2B is a fragmented section view of a portion of the shirt with spinning globe according to the present invention, showing a second embodiment of the spinning globe according to the present invention.

In another embodiment, shown in FIG. 2B, pins 202 may be provided to connect the globe 100 to the frame 14. The pins 202 may be fixed to diametrically opposed positions of the globe 100 and configured to rotate in holes defined within the frame 14. Alternatively, the pins 202 may be fixed in the frame 14, but rotatably mounted to the globe 100.

The globe 100 may be removed from the frame 14 and any other spherical object may be replaced within the frame 14. The globe 100 is therefore interchangeable with any spherical object.

Figure 3:
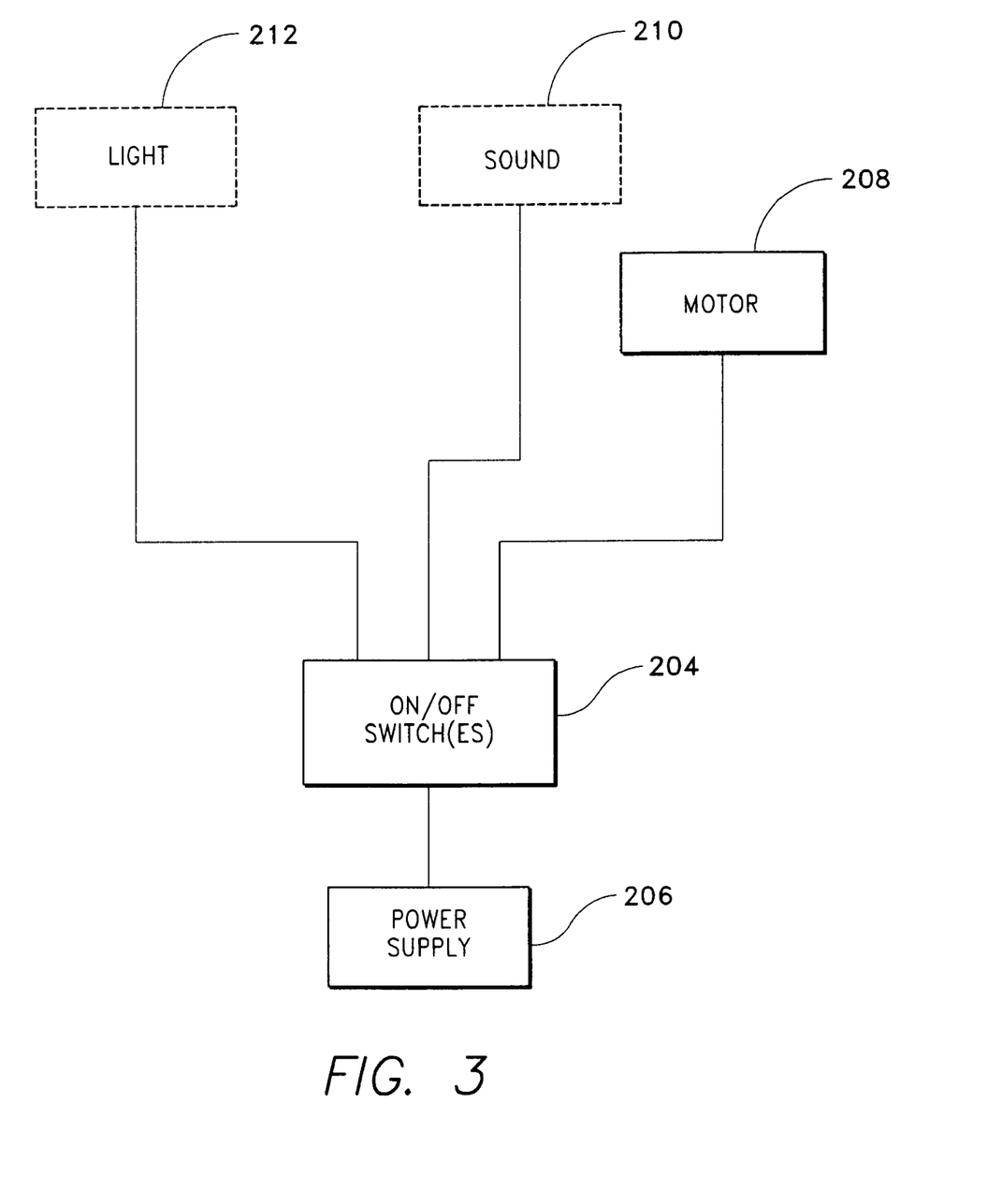
FIG. 3 is a block diagram of electronic components optionally incorporated into the spinning globe of the present invention.

Optionally, the shirt with spinning globe 10 may be configured to allow for automated rotation of the globe 100, illumination of the globe 100, and/or activation of an audio device. Automation of the spinning globe 100 can be accomplished in any conventional manner known in the art. As shown in FIG. 3, the shirt with spinning globe 10 may be equipped with one or more switches 204, which may be located on the shirt 10 itself, on the globe 100, or on the frame 14, that can be triggered to connect a power supply 206 to an appropriate electrical device or circuit. The power supply 206 can be, for example, one or more batteries, e.g., a watch battery, AA or AAA alkaline batteries, a lithium battery, etc. The power supply 206 may be a direct current from an electrical outlet or other source of current. The power supply 206 provides sufficient voltage and current to activate a motor 208, a sound device 210, and/or a light source 212. Alternatively, however, the shirt with spinning globe 10 may be configured in any suitable manner known in the art that would allow the motor 208, the sound device 210, and/or the light source 212 to be activated when a user touches designated portions of the globe 100 or the shirt 10, e.g., by capacitance switches, etc., as is well known in the electrical arts.

Activation of the motor 208 initiates rotation of the globe 100. Rotation of the globe 100 provides children and adults with a better understanding of how the earth revolves on its axis and the cycles of day and night. The motor may be a small piezoelectric motor, a stepper motor, or any other motor known in the art.

Activation of the sound device 210 triggers an audio message that identifies or describes the geographic location(s) displayed once the globe 100 has returned to a stationary position after spinning. The sound device 210 may be a magnetic tape or audio chip connected to a speaker. For example, if the globe 100 stops its rotation with the continent of Europe displayed, the audio may recite an appropriate informational message, such as: "This is Europe, an area with many countries. These countries are Spain, France, Germany . . . ."

Activation of the light source 212 illuminates the globe 100. Illumination of the globe 100 allows a child to use the shirt 10 at night, while traveling in a car, for example. The light source 212 may be an incandescent light, one or more light-emitting diodes, a fluorescent light, or any other illumination source known in the electrical arts. For this purpose, the globe 100 may be made of translucent material and the light source 212 may be disposed within, behind, above, or below the globe 100.

Figure 4:
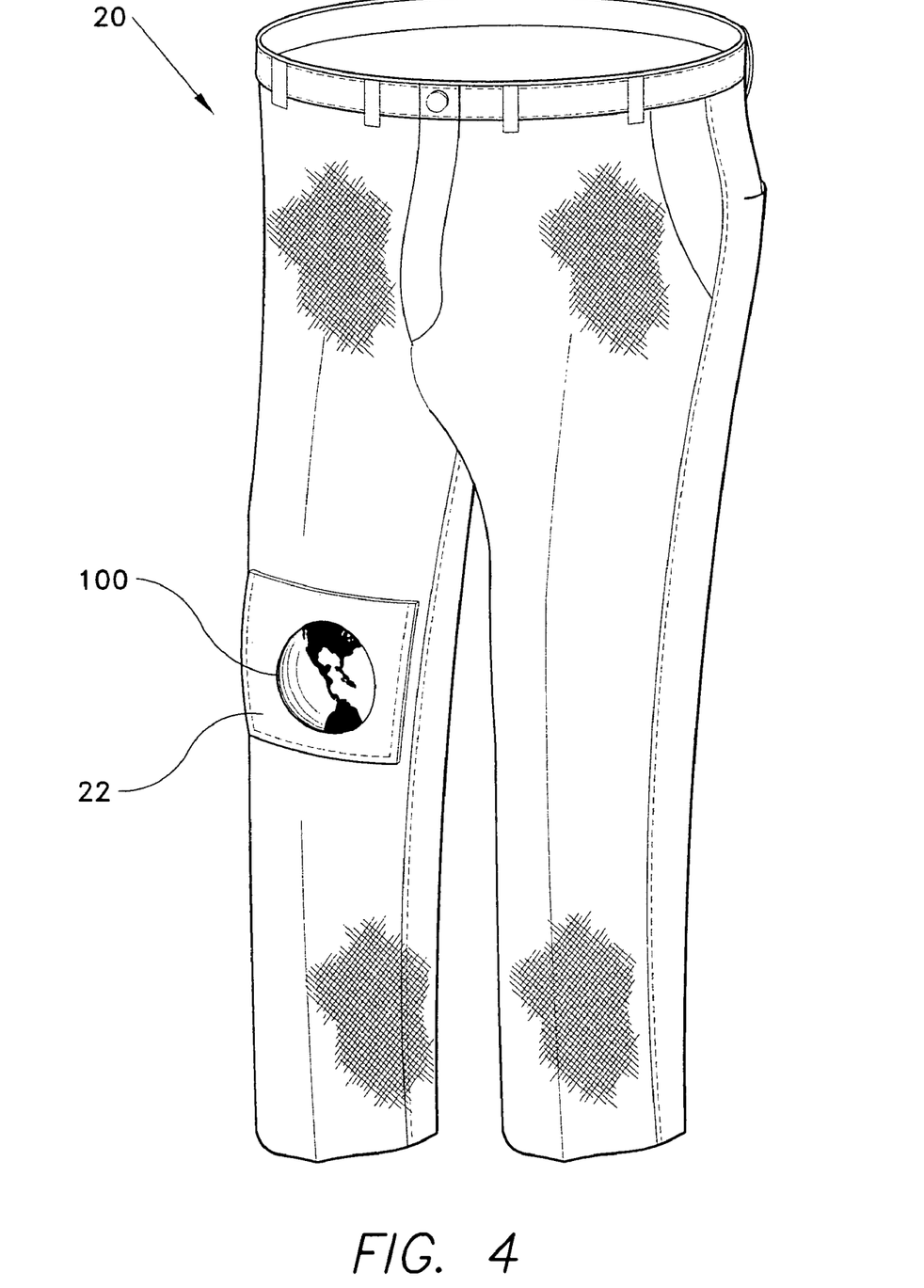
FIG. 4 is a perspective view of pants with spinning globe according to a second embodiment of the spinning globe of the present invention.
Figure 5:
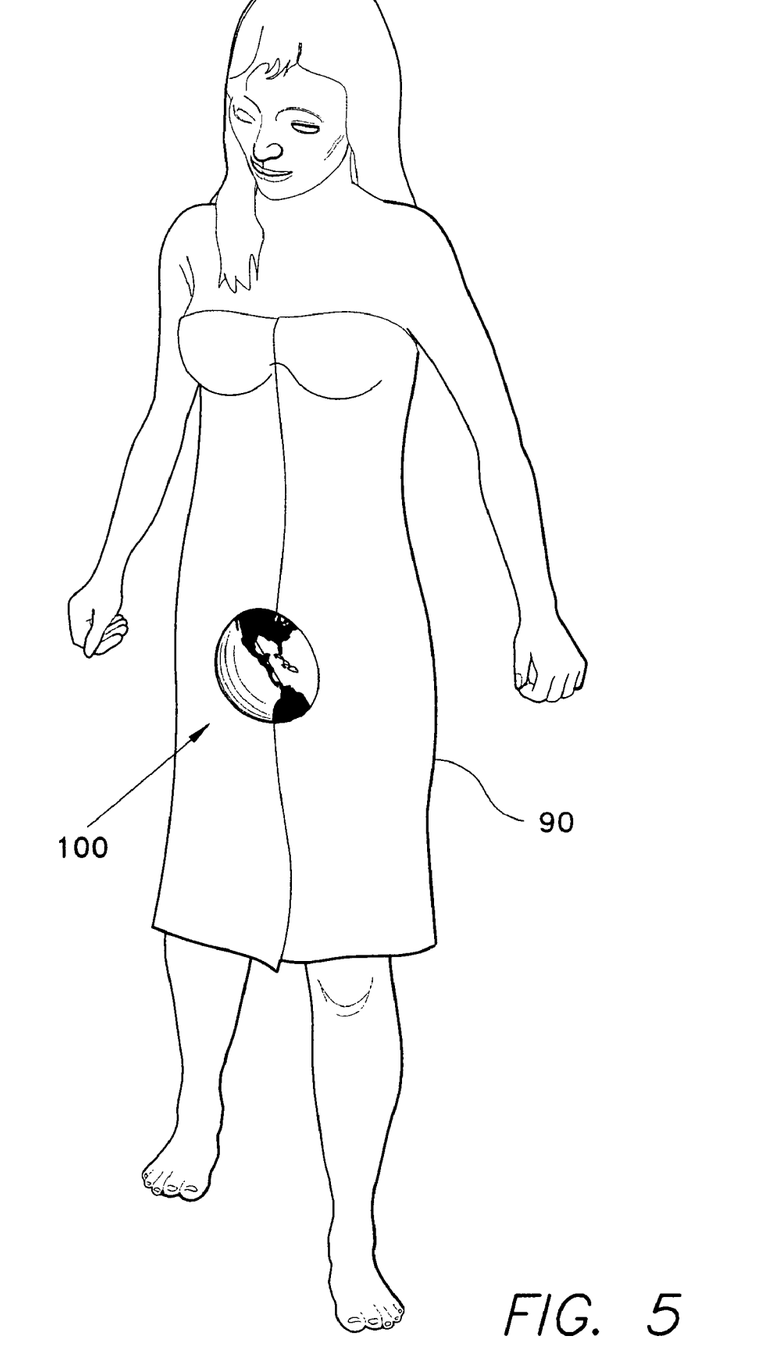
FIG. 5 is a perspective view of a dress with spinning globe according to a third embodiment of the spinning globe of the present invention.

FIG. 4 shows a perspective view of a pair of pants with spinning globe 20. The pair of pants 20 is adapted for wear by a man or woman. The three-dimensional globe 100 is attached to the pants 20. The globe 100 is rotatable within the fabric of the pants 20. The pants 20 may have a pocket 22 built into the knee of the pants 20. The globe 100 may be rotatably mounted in the pocket 22 of the pants 20. The globe 100 can be positioned within the fabric of the pocket 22 in any manner that would allow a user to manually rotate the globe 100 within the pocket 22. A portion of the globe is visible outside the fabric of the pants 20. Alternatively, the spinning globe 100 may be incorporated into a dress 90, as shown in FIG. 5, or into any other article of wearing apparel, as desired.

Figure 6:
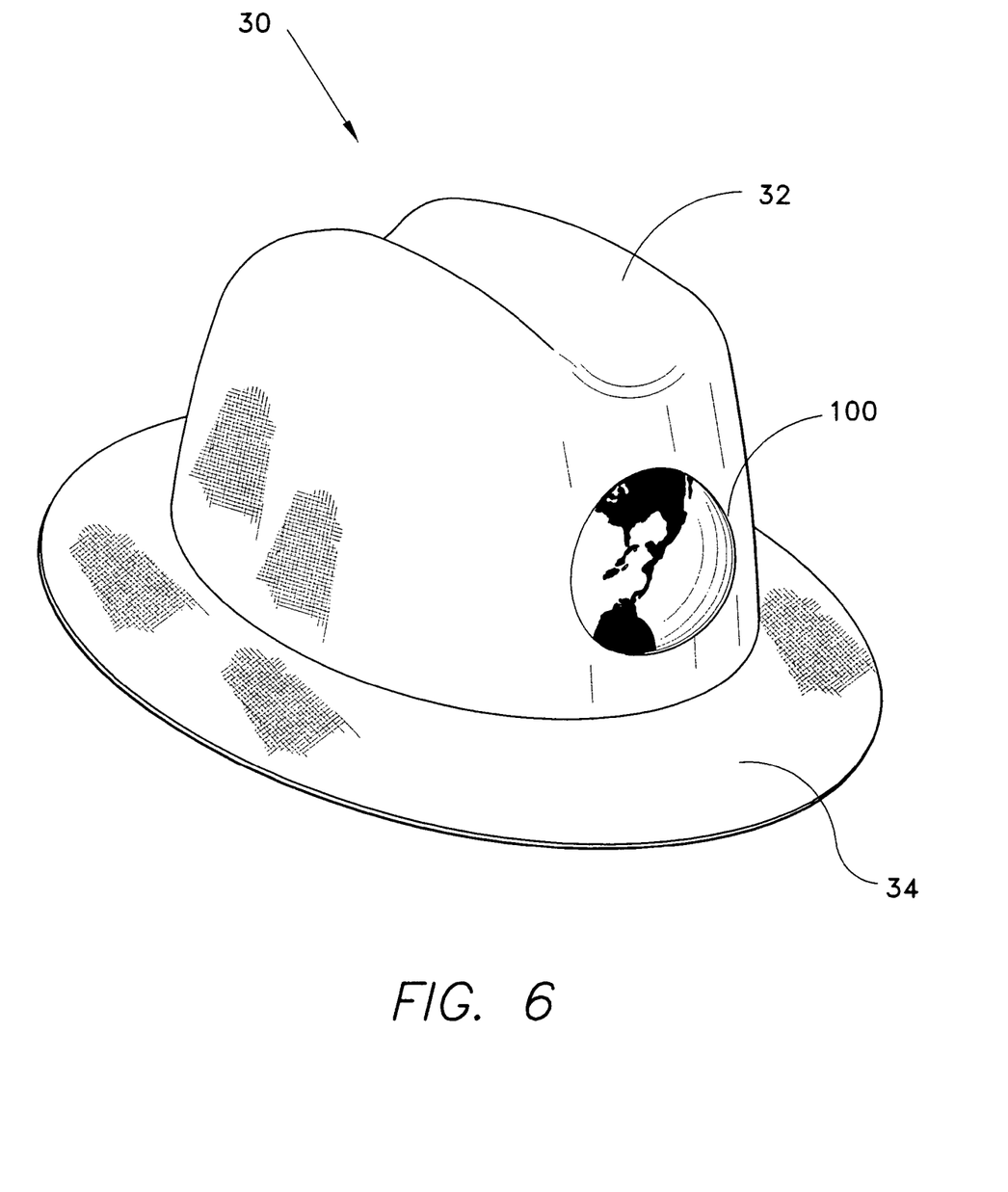
FIG. 6 is a perspective view of a hat with spinning globe according to a fourth embodiment of the spinning globe of the present invention.

FIG. 6 shows a perspective view of a hat with spinning globe 30. The hat 30 is exemplary only, and different styles of hats, whether adapted for wear by a man or by a woman, may be substituted therefor, if capable of supporting a spinning globe. The hat 30 includes a crown portion 32 extending to a lower brim 34. The three-dimensional globe 100 is attached to the crown portion 32 of the hat 30. The globe 100 is rotatable within the fabric of the crown portion 32. The globe 100 may be rotatably mounted in any suitable manner within the hat 30, as discussed above in reference to FIG. 1. The globe 100 can be positioned within the fabric of the hat 30 in any conventional manner that would allow a user to manually rotate the globe 100. A portion of the globe is visible outside the fabric of the hat 30.

Figure 7:
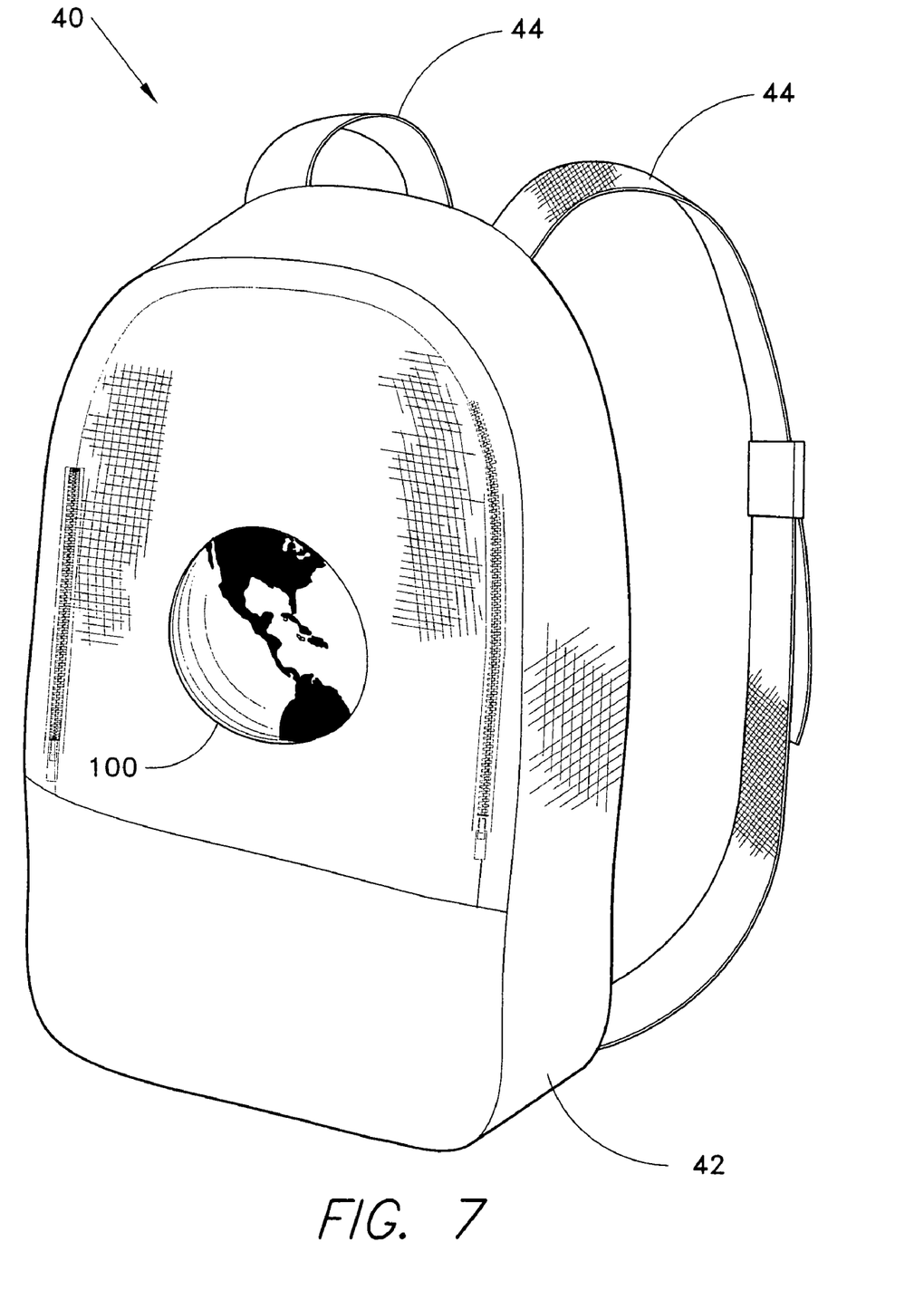
FIG. 7 is a perspective view of a backpack with spinning globe according to fifth embodiment of the spinning globe of the present invention.

FIG. 7 shows a perspective view of a backpack with spinning globe 40. The backpack 40 includes a body portion 42 into which items may be placed and a pair of straps 44 extending off of the body portion 42. The straps 44 are engageable with the shoulders of a user. The three-dimensional globe 100 is attached to the body portion 42 of the backpack 40. The globe 100 may be rotatably mounted in any suitable manner within the backpack 40, as discussed above in reference to FIG. 1. The globe 100 can be mounted in a wall or side panel of the backpack 40 in any manner that would allow a user to manually rotate the globe 100. A portion of the globe is visible outside the backpack 40.

Figure 8:
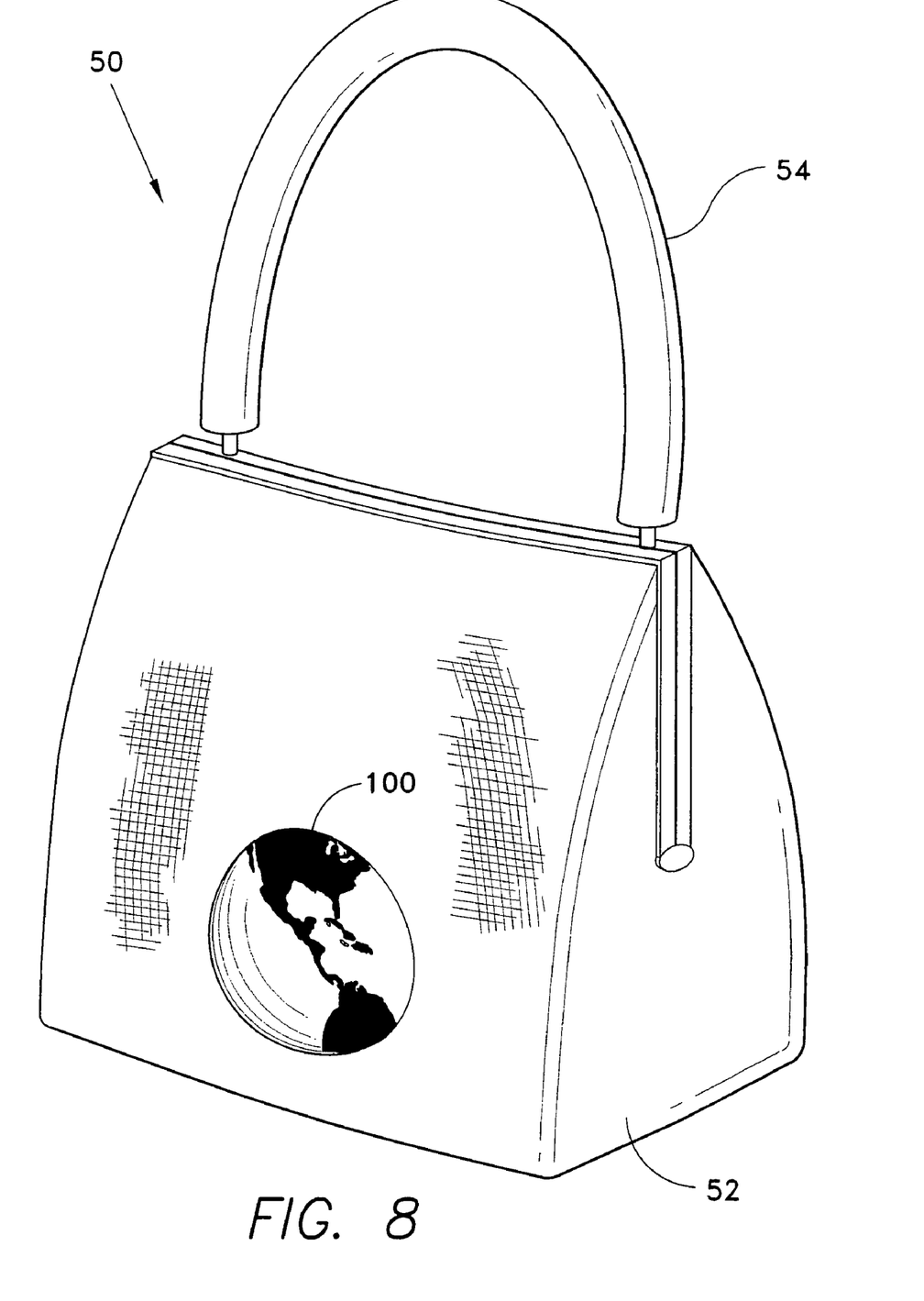
FIG. 8 is a perspective view of a purse with spinning globe according to a sixth embodiment of the spinning globe of the present invention.

FIG. 8 shows a perspective view of a purse with spinning globe 50. The purse 50 includes a body portion 52 into which items may be placed and a strap 54 extending off of the body portion 52. The strap 54 may be held by a user. The three-dimensional globe 100 is attached to the body portion 52 of the purse 50. The globe 100 may be rotatably mounted in any suitable manner within the purse 50, as discussed above in reference to FIG. 1. The globe 100 can be positioned within a wall or side panel of the purse 50 in any manner that would allow a user to manually rotate the globe 100. A portion of the globe is visible outside the fabric of the purse 50.

Figure 9:
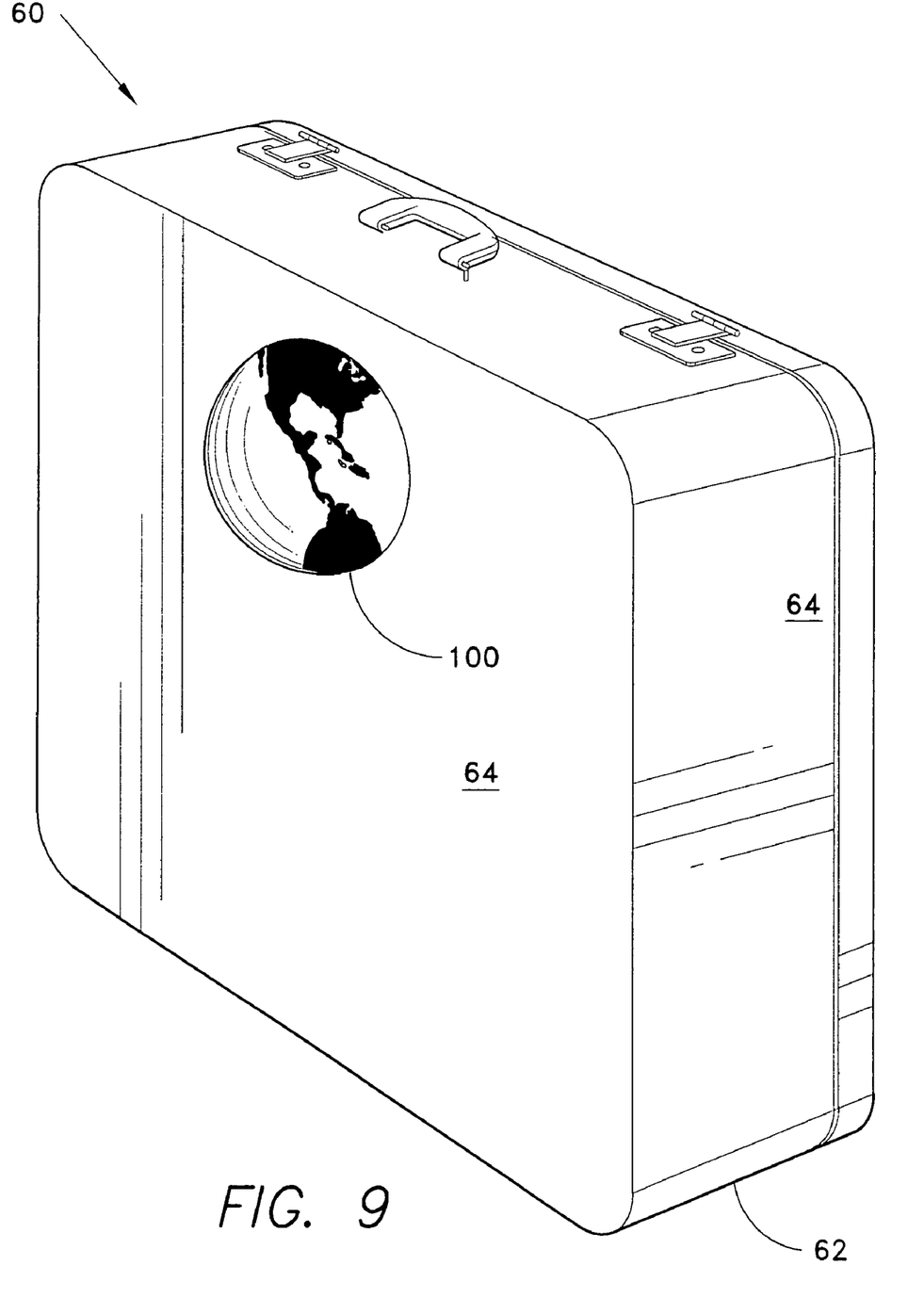
FIG. 9 is a perspective view of a suitcase with spinning globe according to a seventh embodiment of the spinning globe of the present invention.

FIG. 9 shows a perspective view of a suitcase with spinning globe 60. The suitcase 60 includes a body portion 62 into which items may be placed. The body portion 62 has a plurality of walls or side panels 64 that form the body portion 62. The three-dimensional globe 100 is attached to any one of the walls or side panels 64 of the body portion 62 of the suitcase 60 in any location. The globe 100 may be rotatably mounted in any suitable manner within the suitcase 60, as discussed above in reference to FIG. 1. The globe 100 can be positioned within one of the side panels 64 of the suitcase 60 in any manner that would allow a user to manually rotate the globe 100. A portion of the globe is visible outside the suitcase 60.

Figure 10:
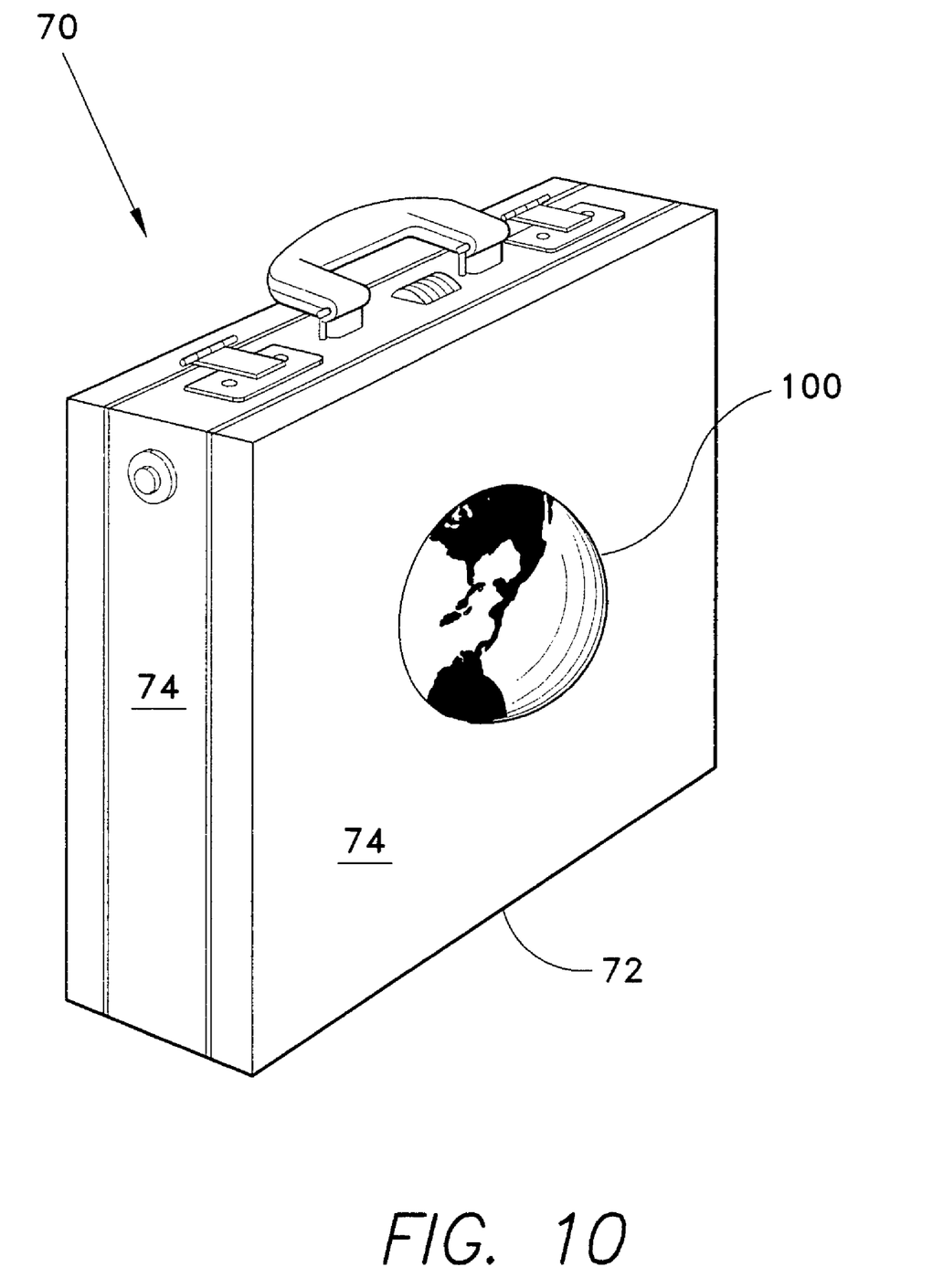
FIG. 10 is a perspective view of a briefcase with spinning globe according to an eighth embodiment of the spinning globe of the present invention.

FIG. 10 shows a perspective view of a briefcase with spinning globe 70. The briefcase 70 includes a main body portion 72 into which items may be placed. The main body portion 72 has a plurality of walls or side panels 74 that form the main body portion 72. The three-dimensional globe 100 is attached to the main body portion 72 of the briefcase 70. The globe 100 may be rotatably mounted in any suitable manner within the briefcase 70, as discussed above in reference to FIG. 1. The globe 100 can be positioned within one of the side panels 74 of the briefcase 70 in any manner that would allow a user to manually rotate the globe 100. A portion of the globe is visible outside the briefcase 70.

Figure 11:
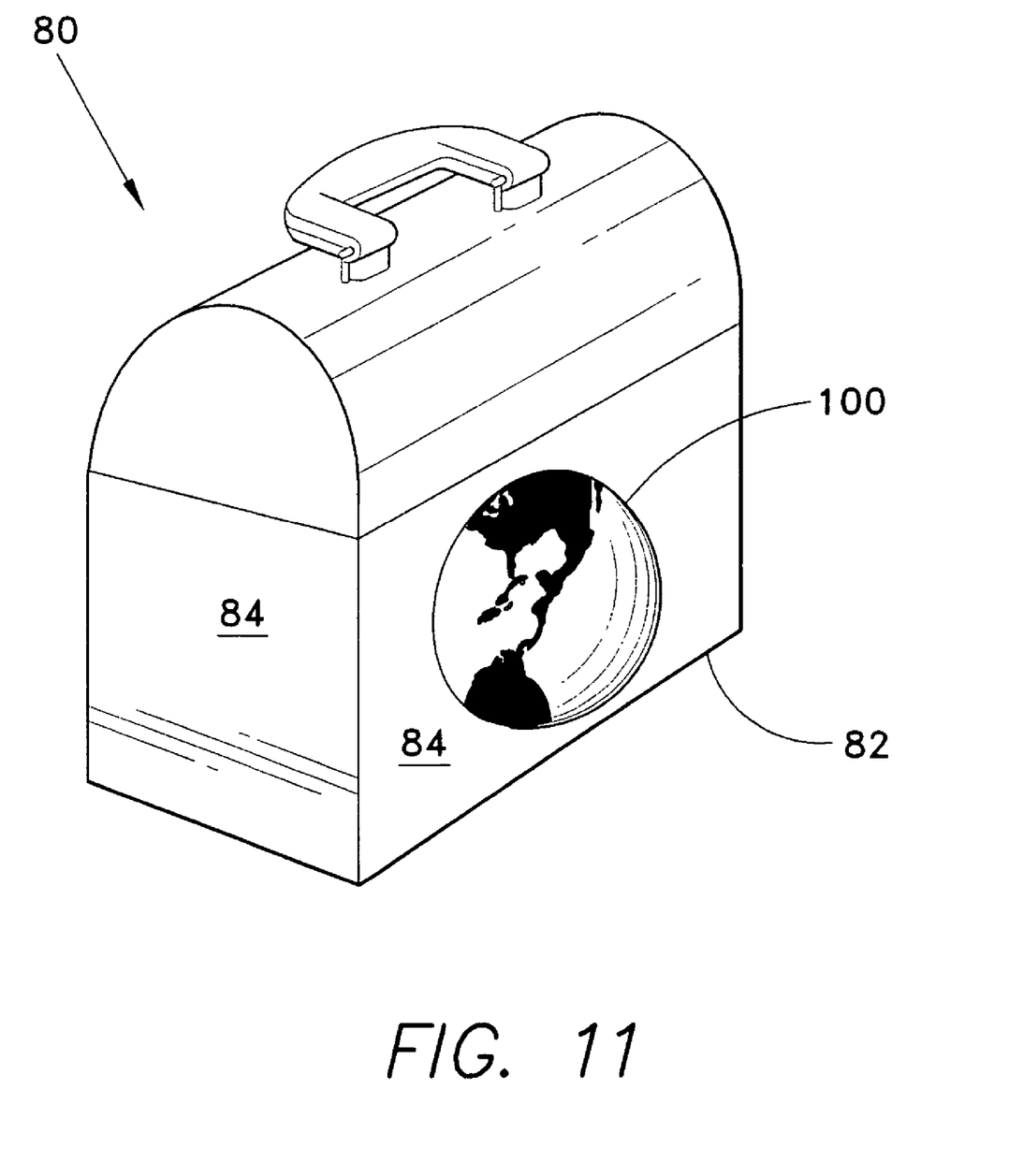
FIG. 11 is a perspective view of a lunchbox with spinning globe according to a ninth embodiment of the spinning globe of the present invention.

FIG. 11 shows a perspective view of a lunchbox with spinning globe 80. The lunchbox 80 includes a main body portion 82 into which items may be placed. The main body portion 82 has a plurality of walls or side panels 84 that form the main body portion 82. The three-dimensional globe 100 is attached to the main body portion 82 of the lunchbox 80. The globe 100 may be rotatably mounted in any suitable manner within the lunchbox 80, as discussed above in reference to FIG. 1. The globe 100 can be positioned within one of the side panels 84 of the lunchbox 80 in any manner that would allow a user to manually rotate the globe 100. A portion of the globe is visible outside the lunchbox 80.

The frame 14 may be attached to the fabric of the shirt 10, pants 20, dress 90, hat 30, backpack 40 or purse 50, or be held within the container wall or side panel of the suitcase 60, briefcase 70 or lunchbox 80. While a rotating globe 100 is shown in the embodiments, any spherical object may be used in place of the globe 100.

The rotating globe 100 may be placed in any of the articles and used by children as an educational tool to learn about geography and the structure of the earth, for example by observing the globe 100 in the shirt 10, the pants 20, the backpack 40 or the lunchbox 80. Also, adults may be able to note specific time zones when traveling or determine where a specific country is in relation to other countries, for example by observing the globe 100 built into the suitcase 60, the briefcase 70, the purse 50 or the backpack 40.

If desired, the spinning globe 100 may be supported by encasing the frame 14 that permits rotation of the globe 100 in cloth or fabric that may be attached to the item of wearing apparel or to a wall or side panel of the carrying container by sewing the frame 14 to the wearing apparel or container, by adhering the frame 14 with adhesive, epoxy, or other resin, by attaching the frame 14 to the wearing apparel or container wall or side panel by fasteners, such as rivets, hook and loop fastening material, or any other attaching method suitable to the frame 14 and the base article in which the spinning globe 100 is to be mounted.

It is to be understood that the present invention is not limited to the embodiments described above, but encompasses any and all embodiments within the scope of the following claims.

I claim:

1. A container with spinning globe, comprising:
a container having side panels;
a supporting frame disposed within a side panel of the container;
means for attaching the supporting frame to the container;
a three-dimensional globe depicting the earth removably mounted within the supporting frame, at least a portion of the object being visible outside the container; and
means for rotatably mounting the globe within the supporting frame;
whereby, the globe is adapted for teaching a person about the geography of the earth.

2. The container according to claim 1, wherein the attaching means includes a plurality of attachment holes defined in the frame.

3. The container according to claim 1, wherein the container is a backpack.

4. The container according to claim 1, wherein the container is a purse.

5. The container according to claim 1, wherein the container is a suitcase.

6. The container according to claim 1, wherein the container is a briefcase.

7. The container according to claim 1, wherein the container is a lunchbox.

* * * * *